United States Patent [19]

Melcher et al.

[11] Patent Number: 4,653,600

[45] Date of Patent: Mar. 31, 1987

[54] ELECTRONIC BALANCE HAVING PARALLEL ROD GUIDES AND HAVING A SCALE ON TOP

[75] Inventors: Franz-Josef Melcher, Hardegsen; Günther Maaz, Uslar-Wiensen; Eduard Bierich; Eberhard Stadler, both of Göttingen; Christoph Berg, Adelebsen, all of Fed. Rep. of Germany

[73] Assignee: Sartorius GmbH, Fed. Rep. of Germany

[21] Appl. No.: 828,182

[22] Filed: Feb. 11, 1986

[30] Foreign Application Priority Data

Feb. 14, 1985 [DE] Fed. Rep. of Germany ....... 3505070

[51] Int. Cl.⁴ .................. G01G 3/08; G01L 25/00
[52] U.S. Cl. ............................. 177/229; 73/1 B
[58] Field of Search ............ 177/212, 229; 73/1 B

[56] References Cited

U.S. PATENT DOCUMENTS

| | | | |
|---|---|---|---|
| 3,494,435 | 2/1970 | Rouban | 177/229 X |
| 4,485,881 | 12/1984 | Tramposch et al. | 177/229 X |
| 4,501,160 | 2/1985 | Johnson | 177/229 X |
| 4,561,512 | 12/1985 | Tramposch | 177/229 |
| 4,598,781 | 7/1986 | Tramposch | 177/229 |
| 4,606,421 | 8/1986 | Schroeder | 177/229 |

Primary Examiner—George H. Miller, Jr.
Attorney, Agent, or Firm—Eric P. Schellin

[57] ABSTRACT

In a parallel rod guide for electronic balances having a measured value sensor, typically corner load adjustments are made by adjusting the parallelism of the two rods and such adjustments are normally sufficient. However, this can eliminate only linearly load-dependent corner load errors. In order to eliminate corner load errors which are non-linearly dependent on the load, the present invention provides an adjustment assembly which varies the resilience of the fastening points on the system carrier side of at least one rod to horizontal forces. The adjustment assembly may comprise, a screw/nut connection whose position can be varied vertically therewith, varying the effective length of a resilient intermediate part.

9 Claims, 5 Drawing Figures

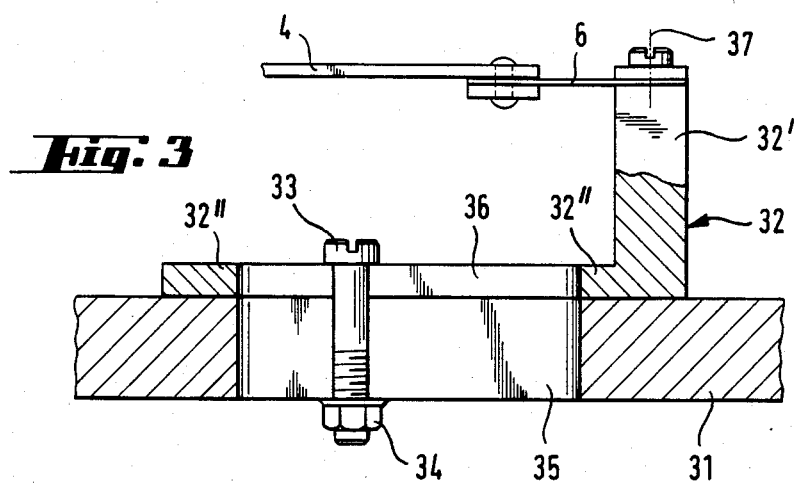
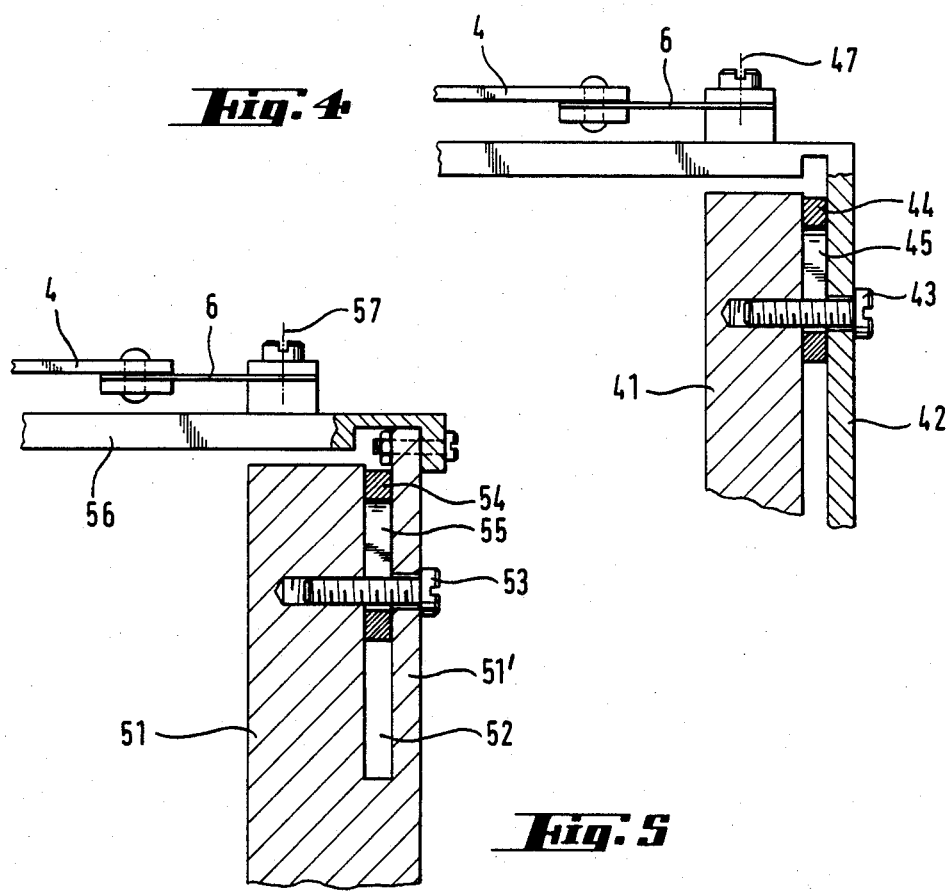

ELECTRONIC BALANCE HAVING PARALLEL ROD GUIDES AND HAVING A SCALE ON TOP

BACKGROUND OF THE INVENTION

1. Field of the Invention

The invention is directed to an electronic balance with a weighing scale, a weighing scale carrier, a system carrier fixed to a housing, an upper and a lower rod, whereby the two rods are connected on one side to the system carrier and on the other side to the weighing scale carrier, to form a parallel guide for the weighing scale carrier and the weighing scale. The balance is also provided with means for adjusting the parallelism of the two rods.

2. Description of the Prior Art

Balances of this type are generally known. The parallelism of the two rods in such scales, is adjusted either by removing material in the area of one or more articulation points, as is described in DE-OS No. 34 22 042, or by a special shaping of the fastening points of the rods, as is described in DE-OS No. 27 10 733 or in another embodiment in DE-OS No. 3003 862. Moreover, DE-OS No. 26 37 539 teaches that the adjusting devices can be divided into a device for coarse adjustment and one for fine adjustment.

However, corner load errors sometimes remain at high resolutions of the balance which can no longer be removed by the known parallelism adjustment of the rods of the parallel guide because these corner load errors are non-linearly load-dependent and can have, for example, the same deviation sign in relation to the center on both sides of the balance. Corner load errors of this type are described, for example, in EP No. 0 080 702, which does indicate a remedy to this problem. However, this remedy is limited in its application to balances with a single-piece parallel guide and results in a weakening of the rod, especially as regards its buckling load.

SUMMARY

The subject invention has the task of disclosing a simple adjusting device for an electronic balance with a scale on top and with a parallel rod guide which permits non-linearly load-dependent corner load errors to be removed independently of the rod structure and without decreasing the load carrying ability.

The invention achieves this task by providing adjusting means which vary the resilience of the fastening points of at least one rod, on the system carrier side, to horizontal forces.

A change in resilience results in a change of geometry under corner loads, affecting the load dependency of the corner load error. The non-linearity of the corner load error can be compensated in this manner by skillful adjustment. Any remaining linearly dependent corner load error can be removed by means of the known corner load adjustments which affect the parallelism of the rods.

This varying of the resilience to horizontal forces is advantageously achieved as follows: The rod(s) is (are) fastened to an intermediate part which is more resilient than the system carrier, the intermediate part is then clamped fast to the system carrier fixed to the housing by at least one clamping device and the position of this clamping device can be varied.

This clamping device comprises a screw/nut combination which rests in and can be shifted along an oblong hole in the system carrier and the intermediate part. The clamping screw can extend horizontally, so that the intermediate part and the system carrier are pressed against one another along a vertical clamping surface and the position of the clamping screw/nut can be varied in a vertical direction. In an alternate embodiment, the clamping screw may extend vertically, so that the intermediate part and the system carrier are pressed against one another along a horizontal clamping surface and the position of the clamping screw/nut connection can be varied in a horizontal direction.

Both rods can be fastened to the intermediate part, and the clamping between the intermediate part and the system carrier occurs by means of several screw/nut connections, advantageously one screw/nut connection per rod fastening point. In this way each connection can be varied in its position independently of the others. This allows the fastening points of the upper and lower rods to be varied separately from each other in their resilience to horizontal forces. The clamping surfaces between the intermediate part and the system carrier can either rest on their entire surface or only via thin distance sleeves at the point of the screw/nut connection.

It is also advantageous if the intermediate part is screwed fast to the system carrier and a distance piece which can be shift vertically is positioned between the intermediate part and the system carrier.

In another embodiment the intermediate part and the system carrier can also be manufactured from a single piece and be separated only a vertical slot, whereby one or more horizontal screws may connect the intermediate part and the system carrier, and at least one height-adjustable distance piece is located in the slot.

BRIEF DESCRIPTION OF THE DRAWINGS

The invention is described below using the example of a balance utilizing the electromagnetic compensation of force and lever transmission as illustrated in the below described figures.

FIG. 3 shows cross section of a rod fastening point in another embodiment.

FIG. 4 shows a cross section of a rod fastening point in a third embodiment.

FIG. 5 shows a cross section of a rod fastening point in a fourth embodiment.

DETAILED DESCRIPTION

Figure 1:
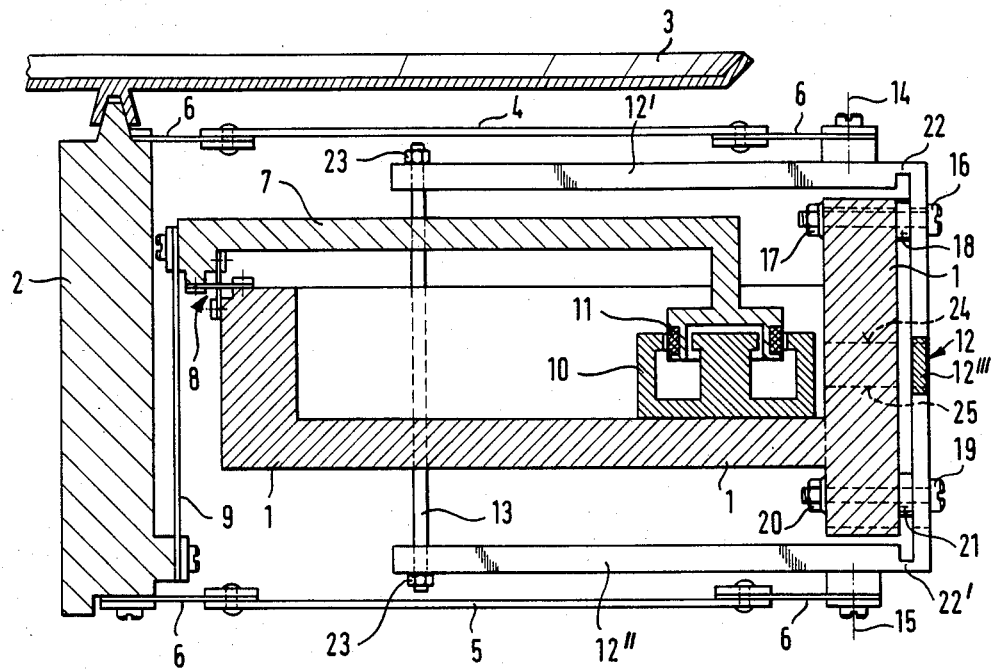
FIG. 1 shows a cross section of the first embodiment of the balance.

The electronic balance shown in section in FIG. 1 comprises rigid system carrier 1, which is permanently connected to the balance housing (not shown). A rather thin and therefore flexible intermediate part 12 is fastened to system carrier 1, and provides fastening points 14 for upper rod 4 and fastening points 15 for lower rod 5. Both rods 4, 5 are provided on both their ends with articulations 6, and form the parallel guides for weighing scale carrier 2 and weighing scale 3 of the electronic balance in a known manner. The weight force acting on weighing scale 3 is transmitted via coupling band 9 onto the shorter lever arm of transmission lever 7. Transmission lever 7 is mounted by universal band joint 8 to the system carrier fixed to the housing. Coil 11 is fastened to the longer lever arm of transmission lever 7, which is in the field of permanent magnet 10 and generates the load-dependent counterforce in a known manner via an electronic control circuit.

The known corner load adjustment by adjusting the parallelism of the two rods 4, 5 occurs in the balance of FIG. 1 by rotating one of nuts 23 located on spindle 13. This presses the two shanks 12', 12" of intermediate part 12 more or less together, whereby thin areas 22, 22' act as articulations, and the vertical distance of fastening points 14, 15 of both rods 4, 5 can be varied in the micrometer range.

Figure 2:
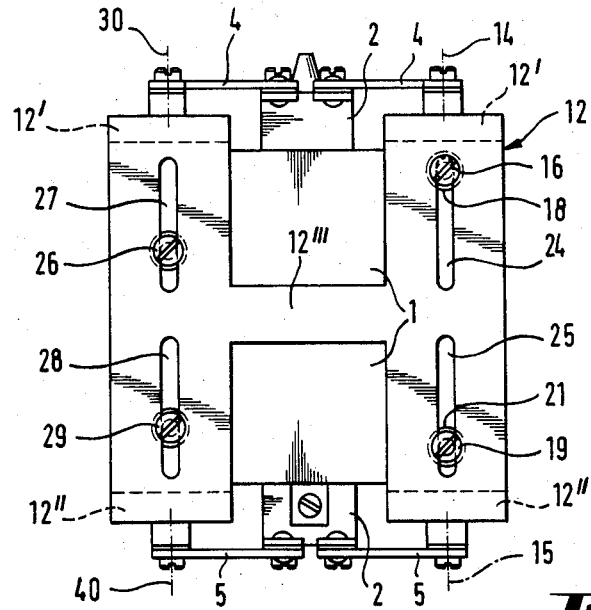
FIG. 2 shows a rear view of the balance illustrated FIG. 1.

As is apparent from FIG. 1 and FIG. 2, intermediate part 12 is clamped fast to system carrier 1 by 4 screw/nut connections (screws 16, 19, 16, 29 and nuts 17, 20). Distance sleeves 18 and 21 are located on each screw between intermediate part 12 and system carrier 1. The screw/nut connection can be positioned anywhere in oblong holes 24, 25, 27, 28. Even after the weighing system has been mounted, a screw/nut connection can be loosened, shifted vertically in the oblong hole and then fixed again. This does not change the position of intermediate part 12 in relation to system carrier 1. It also does not change the vertical distance of the two fastening points 14, 15 and 30, 40 of both rods 4, 5. The only thing that is changed is the resilience of the rod fastening points to horizontal forces (in the drawing plane of FIG. 1).

For example, if screw/nut connection 16/17 is located far up, that is, near fastening point 14 of upper rod 4, this fastening point 14 will yield only very little under horizontal forces from the rod, that is, under off-center loading of weighing scale 3, since elastic intermediate part 12 is supported near fastening part 14 on rigid system carrier 1. If, on the other hand, screw/nut connection 16 is located far down in oblong hole 27, the associated fastening point 30 for the other shank of rod 4 is much more yielding to horizontal rod forces, since it is not supported on rigid system carrier 1 until after a longer bending range in intermediate part 12.

Therefore, the resilience of each individual rod fastening point 14, 15, 30, 40 can be adjusted individually by means of the four screw/nut connections 16, 17; 19, 20; 26 and 29. This offers a great number of possibilities of adjustment. It is frequently sufficient, however, if the clamping is made variable at only two positions. For example, clamping screws 16, 26 may be allowed to shift in oblong holes, while screws 19, 20 are located at fixed positions or the lower rod is directly fastened to system carrier 1. It can also be advantageous to dispense with distance sleeves 18, 21. This results in a different resilience to traction and pressure forces in the rod, and as such can compensate for any non-linear behavior of the rod present from traction and pressure forces. Moreover, it is also possible to omit the central area 12''' (in FIG. 2) of intermediate part 12, so that intermediate part 12 consists of two parts, without essentially changing the operation of the invention.

FIG. 3 shows another embodiment of the clamping between intermediate part 32 and system carrier 31. Only one fastening point of one rod is shown in section. Intermediate part 32 consists of rigid part 32' and a more elastic horizontal part 32". Screw 33 with nut 34 clamps intermediate part 32 fast to system carrier 31. Screw 33 can shift horizontally in oblong hole 36 in intermediate part 32 and in oblong hole 35 in the system carrier. This again varies the effective length of flexible area 32" and therewith the resilience of rod fastening point 37 to horizontal rod forces. The second fastening point of the same rod is constructed in exactly the same fashion. If required, the two fastening points of the second rod can also be correspondingly constructed. It is also possible in this embodiment to provide a distance sleeve between the intermediate part 32, and system carrier 31, as was described and shown in the embodiment of FIGS. 1 and 2.

FIG. 4 shows another embodiment of the connection between the intermediate part and the system carrier. Here, intermediate part 42 is screwed fast to system carrier 41 by screw 43. Distance piece 44 with oblong hole 45 is located between intermediate part 42 and system carrier 51. This makes it possible for distance piece 44 to be shifted vertically when screw 43 is loosened. This varies the length of the free end of intermediate part 42 and therewith its resilience of rod fastening point 47 to horizontal forces.

FIG. 5 shows a fourth embodiment of a rod fastening point 57 in section. This embodiment differs from that of FIG. 4 in that portion 51' of system carrier 51 forms the intermediate part and is separated from the rest of the system carrier by vertical slot 52. Portion 51' is connected to the rest of system carrier 51 by screw 53. Slot 52 is bridged by distance piece 54 which can be shifted vertically because of oblong hole 55. Rod 4 is then fastened to traverse 56 which is screwed to area 51; of the system carrier. Slot 52 can be produced directly during casting of the system carrier or it can be subsequently manufactured by sawing or milling.

We claim:

1. Electronic balance comprising a weighing scale, a weighing scale carrier, a system carrier fixed to a housing, an upper and a lower rod, whereby the two rods have fastening points for fastening one side of the rods to the system carrier and on the other side to the weighing scale carrier forming a parallel guide for the weighing scale carrier and the weighing scale, and having means for adjusting the parallelism of the two rods, further characterized in that adjustment means (16, 27; 19, 20; 26; 29; 33, 34; 44; 54) are provided for varying the resilience of at least one fastening point, (14, 15, 30, 40, 37, 47, 57) on the system carrier side of at least one rod, to horizontal forces.

2. Balance according to claim 1, characterized in that at least one rod (4, 5) is fastened to an intermediate part (12, 32, 42), the intermediate part (12, 32, 42) is more resilient than the system carrier (1, 31, 41) and is clamped fast by means of at least one clamping device (16, 27; 19, 20; 26; 29; 33, 34; 43, 44) to the system carrier (1, 31, 41) which is fixed to the housing, and that the position of the clamping device (16, 27; 19, 20; 26; 29; 33, 34; 43, 44) can be varied.

3. Balance according to claim 2, characterized in that the intermediate part (12, 32) is clamped fast to the system carrier (1, 32) by means of at least one screw/nut connection (16, 27; 19, 20; 26; 29; 33, 34) and that the bores for this screw/nut connection (16, 27; 19, 20; 26; 29; 33, 34) in the intermediate part (12,32) and in the system carrier (1, 31) form an oblong hole (24, 25, 27, 28, 35, 36) so that the screw/nut connection (16, 27; 19, 20; 26; 29; 33, 34) can be located at different positions.

4. Balance according to claim 3, characterized in that the intermediate part (12) and the system carrier (1) each has a vertical clamping surface which are pressed against each other by at least one horizontal screw/nut connection (16, 27; 19, 20).

5. Balance according to claim 4, characterized in that both rods (4,5) are fastened to the intermediate part (12)

and that the intermediate part (12) is clamped fast to the system carrier (1) by at least one screw/nut connection (16, 27; 19, 20; 26; 29) per rod fastening point (14, 15, 30, 40).

6. Balance according to claim 3, characterized in that the intermediate part (32) and the system carrier each has a horizontal clamping surface which are pressed against each other by at least one vertical screw/nut connection (33, 34).

7. Balance according to either claims 2, 3, 5, or 6 characterized in that each screw/nut connection (16, 27; 19, 20; 26; 29; 33, 34) carries a distance sleeve (18, 21) located between the intermediate part (12, 32) and the system carrier (1, 31).

8. Balance according to claim 1 characterized in that at least one of the rods (4,5) is fastened to an intermediate part (42), the intermediate part (42) is more resilient than the system carrier (41) and is screwed fast to the system carrier (14) fixed to the housing, and a vertically adjustable distance piece (44) is located between the intermediate part (42) and the system carrier (14).

9. Balance according to claim 1, characterized in that the fastening points (57) of at least one of the rods (4) are separated by a vertical slot (52) from the system carrier (51) fixed to the housing, that at least one horizontal screw (53) connects the two areas separated by the slot (52) and that at least one height-adjustable distance piece (54) is located in the slot (52).

* * * * *